United States Patent
Chu et al.

(10) Patent No.: US 11,275,926 B2
(45) Date of Patent: Mar. 15, 2022

(54) FACE TRACKING METHOD AND DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Minglei Chu, Beijing (CN); Hao Zhang, Beijing (CN); Lili Chen, Beijing (CN); Jian Sun, Beijing (CN); Ziqiang Guo, Beijing (CN); Guixin Yan, Beijing (CN); Jiankang Sun, Beijing (CN); Xi Li, Beijing (CN); Yinwei Chen, Beijing (CN); Ruifeng Qin, Beijing (CN); Yuanjie Lu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 378 days.

(21) Appl. No.: 16/239,825

(22) Filed: Jan. 4, 2019

(65) Prior Publication Data
US 2019/0311181 A1    Oct. 10, 2019

(30) Foreign Application Priority Data
Apr. 10, 2018  (CN) .......................... 201810315885.2

(51) Int. Cl.
G06K 9/00    (2006.01)
G06T 7/73    (2017.01)
G06T 7/246   (2017.01)

(52) U.S. Cl.
CPC ..... *G06K 9/00281* (2013.01); *G06K 9/00234* (2013.01); *G06K 9/00248* (2013.01);
(Continued)

(58) Field of Classification Search
CPC ........... G06K 9/00281; G06K 9/00234; G06K 9/00248; G06T 7/74; G06T 7/248; G06T 2207/30201
(Continued)

(56) References Cited

U.S. PATENT DOCUMENTS 11,062,176 B2 * 7/2021 Ma ............................ G06T 7/13
2008/0037838 A1 * 2/2008 Ianculescu ......... G06K 9/00234
382/118

(Continued)

OTHER PUBLICATIONS

S. Elaw, W. M. Abd-Elhafiez and M. Heshmat, "Comparison of Video Face Detection methods Using HSV, HSL and HSI Color Spaces," 2019 14th International Conference on Computer Engineering and Systems (ICCES), Cairo, Egypt, 2019, pp. 180-188, doi : 10.1109/ICCES48960.2019.9068182. (Year: 2019).*

(Continued)

*Primary Examiner* — Jonathan S Lee
(74) *Attorney, Agent, or Firm* — Nath, Goldberg & Meyer; Joshua B. Goldberg

(57) ABSTRACT

Disclosed is face tracking method and device. The method includes: acquiring an initial facial image in a to-be-tracked picture; performing binarization processing on the initial facial image according to a standard range of color parameter and an actual value of the color parameter of each pixel in the initial facial image, to obtain a binarized facial image; acquiring a position of a preset organ in the binarized facial image; and acquiring a position of a final facial image according to the position of the preset organ and a position of the initial facial image.

15 Claims, 2 Drawing Sheets

(52) U.S. Cl.
CPC ............... *G06T 7/248* (2017.01); *G06T 7/74* (2017.01); *G06T 2207/30201* (2013.01)

(58) Field of Classification Search
USPC ........................................................ 382/118
See application file for complete search history.

(56) References Cited

U.S. PATENT DOCUMENTS

2010/0158371 A1\* 6/2010 Jung .................. G06K 9/00228
382/169
2014/0334694 A1\* 11/2014 Perez ................. G06K 9/00248
382/117

OTHER PUBLICATIONS

Aldasouqi, Iyad, and Mahmoud Hassan. "Human face detection system using HSV." Proc. Of 9th WSEAS Int. Conf. on Circuits, Systems, Electronics, Control & Signal Processing (CSECS'10). Atenas, Grecia. 2010. (Year: 2010).\*

\* cited by examiner

FACE TRACKING METHOD AND DEVICE

CROSS-REFERENCE TO RELATED APPLICATIONS

The present disclosure claims priority to Chinese Patent Application No. 201810315885.2, entitled "Face Tracking Method and Device", filed on Apr. 10, 2018, the entire contents of which are hereby incorporated into this disclosure by reference.

FIELD OF THE INVENTION

The present disclosure relates to, but is not limited to, the field of human-computer interaction, and in particular to a face tracking method and device.

BACKGROUND

With the rapid development of computer science in the field of human-computer interaction, as a key technology in facial information processing, face tracking technology has drawn widespread attention in the fields of pattern recognition and computer vision. The face tracking technology utilizes features of the face in video frames to achieve the positioning of a face in different video frames, thereby implementing face tracking. The face tracking method in the related art relies on physiological features (e.g., skin color, facial contours, etc.) for tracking, such that the face tracking method in the related art is unable to adapt to environmental changes. Therefore, in the case that environmental factors change, the accuracy of tracking results could decrease. For example, when the face tracking is performed using skin color, an area where greyscale is higher than a threshold is used as a face area. When the environmental factors change, the greyscale of pixels in an image will change. Then, a result obtained according to the tracking method before the environment changes will be deviated.

SUMMARY

According to the first aspect, an embodiment of the disclosure provides a face tracking method, comprising steps of: acquiring an initial facial image in a to-be-tracked picture; performing binarization processing on the initial facial image according to a standard range of color parameter and an actual value of the color parameter of each pixel in the initial facial image, to obtain a binarized facial image; acquiring a position of a preset organ in the binarized facial image; and acquiring a position of a final facial image according to the position of the preset organ and a position of the initial facial image.

Optionally, the face tracking method includes at least one tracking period in which face tracking is sequentially performed for each one of to-be-tracked pictures, and in which the to-be-tracked pictures are pictures including the same face.

Optionally, in each of the tracking periods, in addition to the last to-be-tracked picture, after the step of acquiring a position of a final facial image, the face tracking method further comprises: updating the standard range of color parameter according to the actual value of the color parameter of each pixel of the initial facial image.

Optionally, the position of the preset organ is a position of region where a preset organ feature is satisfied.

Optionally, the color parameter comprises hue, saturation, and brightness. The step of updating the standard range of color parameter according to the actual value of the color parameter of each pixel of the initial facial image in the to-be-detected picture comprises: using the initial facial image in the to-be-tracked picture as a to-be-processed image, and performing the image processing on the initial facial image in the to-be-detected picture by a preset standard range calculation method, to obtain a standard range of hue, a standard range saturation, and a standard range brightness.

Optionally, the preset standard range calculation method comprises: presetting a plurality of groups of reference ranges, each group of reference ranges including a reference range of hue, a reference range of saturation, and a reference range of brightness, wherein reference ranges of brightness in different groups are different from each other; performing binarization processing on the to-be-processed image according to each group of reference ranges, wherein when performing binarization processing on the to-be-processed image, if the actual values of the hue, saturation and brightness of a pixel are within the corresponding reference ranges, greyscale of the pixel is set to 255, otherwise, the greyscale of the pixel is set to 0; judging whether there is a region in each of the binarized images that satisfies the preset organ feature, and if yes, recording a current group of reference ranges; and for the groups of reference ranges recorded, averaging the reference ranges of the hue, the reference ranges of the saturation, and the reference ranges of the brightness, respectively, to obtain a standard range of hue, a standard range of saturation, and a standard range of brightness corresponding to the to-be-processed image.

Optionally, in each group of reference ranges, the reference range of the hue is 0-180, the reference range of the saturation is 20-255, and the reference range of the brightness is V-255, wherein V is an integer greater than or equal to zero and less than 255 and in different groups of the reference range, values of V are different from each other.

Optionally, from the first group to the last group of reference ranges, the values of V are increased by a predetermined step length.

Optionally, the predetermined step length is 10.

Optionally, the preset organ includes a mouth, and the region that satisfies the preset organ feature is a rectangular region formed of successive pixel points having the greyscale of 0, and the rectangular region has a dimension in a width direction of the face three times larger than in a length direction of the face.

Optionally, in each of the tracking period, the method further comprises performing a face detection process before the first to-be-tracked picture is received, the face detection process including: acquiring the initial facial image in the to-be-detected picture, wherein the to-be-detected picture is a picture that is located before the to-be-tracked picture and includes the same face as the to-be-tracked picture; and using the initial facial image in the to-be-detected picture as the to-be-processed image, and performing image processing on the initial facial image in the to-be-detected picture by the preset standard range calculation method, to obtain an initial standard range of color parameter, wherein the initial standard range of color parameter is used to binarize the initial facial image in the first to-be-tracked picture.

Optionally, the to-be-detected picture is an RGB image and the step of acquiring the initial facial image in the to-be-detected picture comprises: acquiring an image of an initial face region in the to-be-detected picture; pre-processing the image acquired to eliminate noises in the image; and converting a pre-processed image from an RGB image to an HSV image.

Optionally, the image of the initial face region in the to-be-detected picture is acquired by haar feature detection.

Optionally, wherein the to-be-track picture is an RGB image, and the step of acquiring an initial facial image in a to-be-tracked picture comprises: acquiring an image of an initial face region in the to-be-tracked picture; pre-processing the image acquired to eliminate noises in the image; and converting a pre-processed image from an RGB image to an HSV image.

Optionally, the image of the initial face area in the to-be-tracked picture is acquired by the camshift algorithm.

Accordingly, an embodiment of the disclosure also provides a face tracking device, comprising a processor and a computer readable storage medium in which a computer program is stored, wherein the steps of the face tracking method as set forth are implemented when the computer program is executed by the processor.

Optionally, the face tracking device further comprises an image capture component configured to continuously capture facial images.

BRIEF DESCRIPTION OF THE DRAWINGS

The drawings are intended to provide a further understanding of the disclosure and constitute a part of the specification. Further, the drawings are used to explain the present disclosure together with the following detailed embodiments but are not intended to limit the disclosure. In the drawing.

DETAILED DESCRIPTION OF THE EMBODIMENTS

Figure 1:
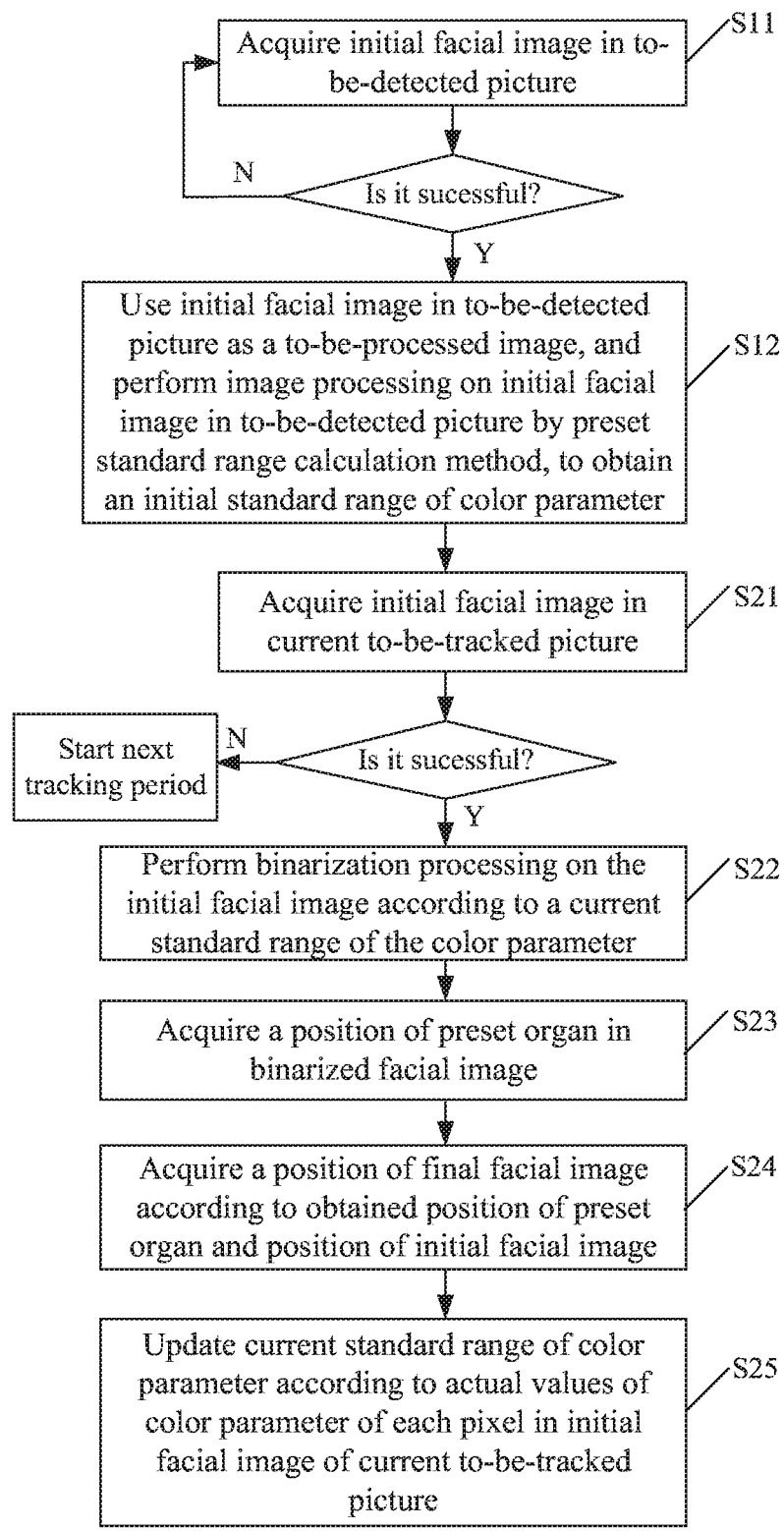
FIG. 1 is a flow chart illustrating a face tracking method according to an embodiment of the present disclosure.

The specific embodiments of the present disclosure will be described in detail below with reference to the accompanying drawings. It is to be understood that the specific embodiments described herein are simply intended to explain and describe the disclosure rather than construed as limitation thereof.

As an aspect of the present disclosure, there is provided a face tracking method. It should be understood that the face tracking method includes at least one tracking period in which the face tracking processing is sequentially performed for each one of to-be-tracked pictures, and in which the to-be-tracked pictures are pictures including the same face in the video stream.

The face tracking method includes: acquiring an initial facial image in a current to-be-tracked picture. Herein, the initial facial image may be an image including a face and nearby region thereof (e.g., neck), and the initial facial image may be acquired by using a tracking method in the related art, for example, a Meanshift method and a Camshift method.

The face tracking method further includes: performing binarization processing on the initial facial image according to a current standard range of color parameter and an actual value of the color parameter of each pixel in the initial facial image. Herein, the binarization process may include: setting pixel greyscale in the initial facial image to 0 or 255. Specifically, when the actual value of color parameter of a certain pixel is within the standard range of color parameter, the greyscale of the pixel is set to 255, otherwise, the greyscale of the pixel is set to 0. The color parameter used herein can be grayscale, either RGB (red-green-blue) value or HSV value (hue-saturation-lightness space). It should be noted that, in the case that the color parameter includes types of parameters, when the actual values of types of the parameter of the pixel are within the corresponding standard range in the process of binarization, the grayscale of the pixel is set to 255; if the actual value of any one of the parameters is not within the corresponding standard range, the greyscale of the pixel is set to zero. Taking the color parameter including HSV values as an example, when an actual H value of one of the pixels is within the standard range of H, and an actual S value of the pixel is within the standard range of S, and an actual V value of the pixel is within the standard range of V, the greyscale of the pixel is set to 255; if the actual value of any one of parameters is not within the corresponding standard range, the greyscale of the pixel is set to 0. Of course, the binarization processing may also include: when the actual value of the color parameter of a pixel is within the standard range of the color parameter, the greyscale of the pixel is set to 0, or otherwise it is set to 255.

The face tracking method further includes: acquiring a position of a preset organ in the binarized facial image; and acquiring a position of a final facial image according to the obtained position of the preset organ and the position of the initial facial image. Herein, the preset organ nay include any one or more of the eyes, the nose, the mouth, and the eyebrows.

In each of the tracking periods, in addition to the last to-be-tracked picture, after the position of the final facial image is acquired, the face tracking method further includes: according to the actual value of the color parameter of each pixel of the initial facial image in the current to-be-tracked picture, updating the current standard range of color parameter.

In the present disclosure, each time the face is tracked, the standard range of color parameter is updated according to the actual value of the color parameter of the current initial facial image. Since the actual value of the color parameter of the initial facial image is related to environmental factors, the standard range after the color parameter is updated is adapted to the environmental factors, such that the position of the organ is adapted to the environmental factors. In addition, since the position of the final facial image is determined by the position of the preset organ and the position of the initial facial image, the tracking method can adapt to the environment for face tracking, such that the accuracy of tracking result can be guaranteed even though the environment changes.

Herein, the "position of the preset organ" described above is a position of region where a preset organ feature is satisfied.

The face tracking method of the present disclosure will be specifically described below with reference to FIG. 1. Each tracking period of the face tracking method includes: sequentially performing face tracking processing for each one of to-be-tracked pictures; in addition, each tracking period further includes: performing a face detection process before the face tracking processing for the first to-be-tracked picture.

In this embodiment, the face detection process includes:

S11, acquiring the initial facial image in the to-be-detected picture.

Herein, the to-be-detected picture is a picture that is located before the to-be-tracked picture and includes the same face as the to-be-tracked picture. The to-be-detected picture may be an RGB image commonly used in a video stream, and the initial facial image in the to-be-detected picture may be an HSV image. At this time, the step S11 may include steps of:

S111, acquiring an image of an initial face region in the to-be-detected picture (the image is an RGB image), wherein, in order to improve the detection accuracy, the image of the initial face region in the to-be-detected picture may be specifically acquired by haar feature detection in Opencv;

S112, pre-processing the image acquired in step S111 to eliminate noises in the image, wherein the pre-processing may specifically include Gaussian filtering processing, for example; and S113, converting a pre-processed image from an RGB image to an HSV image.

The HSV space is less sensitive to changes in illumination brightness compared with the RGB color space. Therefore, in the face detection process and the subsequent face tracking process, the influence of the illumination brightness on the tracking effect can be reduced by first converting the image from the RGB to the HSV image.

Following the step S11, the face detection process further includes: S12, using the initial facial image in the to-be-detected picture as a to-be-processed image, and performing image processing on the initial facial image in the to-be-detected picture by the preset standard range calculation method, to obtain a standard range of color parameter corresponding to the initial facial image in the to-be-detected picture, that is, an initial standard range of color parameter. The initial standard range of the color parameter is used to binarize the initial facial image in the first to-be-tracked picture in subsequent tracking step.

The color parameter may include hue, saturation, and brightness. The standard range of color parameter may include: the standard range of hue, the standard range of saturation, and the standard range of brightness. The preset standard range calculation method includes:

S01, presetting a plurality of groups of reference ranges, each group of reference ranges including a reference range of hue, a reference range of saturation, and a reference range of brightness, wherein reference ranges of brightness in different groups are different from each other.

In an exemplary embodiment of the present disclosure, in each group of reference ranges, the reference range of the hue is 0-180, the reference range of the saturation is 20-255, and the reference range of the brightness is V-255, wherein V is an integer greater than or equal to zero and less than 255. In different groups of the reference range, values of V are different from each other. For example, in the first group of reference ranges, V is set to 0; from the second group to the last group of reference ranges, the values of V are increased by a predetermined step length. For example, the predetermined step length is specifically 10.

S02, for each group of reference ranges, performing binarization processing on the to-be-processed image according to the group of reference ranges, thereby obtaining a plurality of binarized images.

In an exemplary embodiment of the present disclosure, when the to-be-processed image is being binarized, if the actual value of the hue of the pixel is within the reference range of the hue, and the actual value of the saturation is within the reference range of the saturation, and the actual value of the brightness is within the reference range of the brightness, the greyscale of the pixel may be set to 255; otherwise, the greyscale of the pixel is set to 0.

S03, judging whether there is a region in each of the binarized images that satisfies the preset organ features, and if yes, recording a current group of reference ranges.

Figure 2:
FIG. 2 is a schematic diagram illustrating a plurality of images obtained by binarizing a to-be-processed image using a plurality of reference ranges of color parameters.
Figure 2:
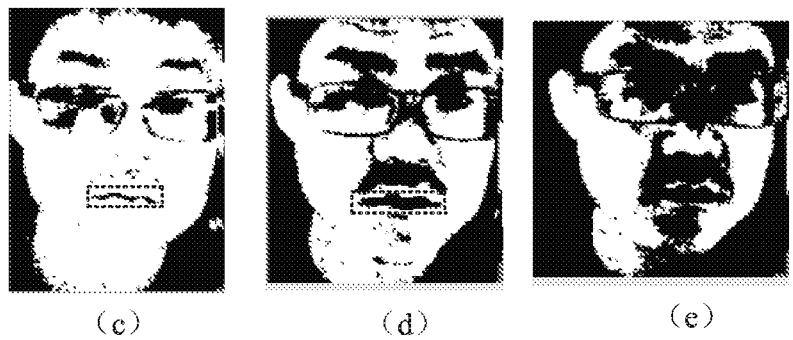

In an exemplary embodiment of the present disclosure, the preset organ includes a mouth, and the region that satisfies the preset organ feature is a rectangular region formed of successive pixel points having the greyscale of 0, and the rectangular region (i.e., dashed frames of FIGS. 2(c) and (d)) has a dimension in a width direction of the face three times larger than in a length direction of the face.

S04, for the groups of reference ranges recorded, averaging the reference ranges of the hue, the reference ranges of the saturation, and the reference ranges of the brightness, respectively, to obtain a standard range of hue, a standard range of saturation, and a standard range of brightness corresponding to the to-be-processed image.

In an exemplary embodiment of the present disclosure, the step of averaging the reference ranges of a certain parameter includes: taking minimum values of the reference ranges and using an average of the minimum values as a minimum value of the standard range the parameter; and taking maximum values of the reference ranges and using an average of the maximum values as a maximum value of the standard range of the parameter. Since the hue has the same reference range and the saturation also has the same reference range in the groups of reference ranges, the standard range of the hue is the above 0-180 and the standard range of the saturation is the above 20-255, and the standard range of brightness is V'-255 in the standard range corresponding to the to-be-processed image, wherein V' is an average of a plurality of V values among the reference ranges recorded, which is an average of a maximum value and a minimum value of V in groups of reference ranges.

It can be understood that, in step S01, the value of V gradually increases from the first group of reference range. Thus, in the process of binarizing the to-be-processed image by using the groups of reference ranges, usually when V is increased to a certain value (denoted as Va), the region that satisfies the preset organ feature occurs in the binarized image; and when the value of V continues to increase to another value (denoted as Vb), the region that satisfies the preset organ feature occurs in the binarized image for the last time. In practical applications, (Va+Vb)/2−255 can be used as the standard range of brightness. For example, FIGS. 2(a) to 2(e) show binarized images when the values of V are V1 to V5, respectively. When the values of V are taken as V3 and V4, respectively, corresponding regions that satisfy the preset organ feature are present in FIGS. 2(c) and 2(d). In this case, the standard range of hue is 0-180, and the standard range of saturation is 20-255, the standard range of brightness is (V3+V4)/2−255.

After the face detection process, face tracking processing is performed on each of the to-be-tracked pictures, and the face tracking process includes steps of S21 to S25.

S21, acquiring an initial facial image in the current to-be-tracked picture;

S22, performing binarization processing on the initial facial image according to a current standard range of the color parameter;

S23, acquiring a position of a preset organ in a binarized facial image;

S24, acquiring a position of a final facial image according to the obtained position of the preset organ and the position of the initial facial image; and S25, updating the current standard range of the color parameter according to actual values of color parameter of each pixel in the initial facial image of the current to-be-tracked picture.

Here, the to-be-tracked picture is an RGB image. The step S21 specifically includes steps S211 to S213.

S211, acquiring an image of an initial face region in the current to-be-tracked picture. The image of the initial face area in the to-be-tracked picture can be acquired by the camshift algorithm in Opencv, to increase the calculation speed. The camshift algorithm may acquire the initial facial image of the current to-be-tracked picture using the initial facial image in the previous to-be-tracked picture and a histogram of HSV channels of the initial facial image. It should be noted that if the current to-be-tracked picture is the first to-be-tracked picture, the previous to-be-tracked picture thereof is the to-be-detected picture.

S212, pre-processing the acquired image of the initial face region. This step can be used to eliminate noises in the image, thereby reducing noise interference for the face tracking. The pre-processing in this step can be performed, for example, by the Gaussian filtering method.

S213, converting a pre-processed image from an RGB image to an HSV image.

In step S22, it should be understood that if the current to-be-tracked picture is the first to-be-tracked picture, the current standard range of the color parameter is the standard range obtained in the above step S12; and if the current to-be-tracked picture is a to-be-tracked picture after the first to-be-tracked picture, the current standard range of the color parameter is an updated standard range after performing step S25 on the previous to-be-tracked picture.

In step S23, the position of the region that satisfies the preset organ feature in the binarized facial image is acquired. The preset organ includes a mouth. As described above, the region that satisfies the preset organ feature is a region of a rectangular box of a plurality of consecutive pixel points with a grayscale of 0, and the rectangular box has a dimension in a width direction of the face three times larger than in a length direction of the face.

In step S24, as described above, the initial facial image in the to-be-tracked picture may include a face and a neck. At this time, step S24 may specifically include: calculating a distance between a mouth position and a lower edge of the initial facial image and removing a portion of area near the lower edge of the initial facial image to obtain a final facial image. In an exemplary embodiment, the removed area has a dimension of 0.2a-0.3a in the length direction of the face.

For each of to-be-tracked pictures in addition to the last one, the face tracking process after S24 further includes: S25, according to the actual value of the color parameter of each pixel in the initial facial image of the current to-be-tracked picture, updating the current standard range of color parameter. The step S25 specifically includes: using the initial facial image in the current to-be-tracked picture as the to-be-processed image, and using the preset standard range calculation method (steps S01 to S04) to process the initial facial image in the current to-be-tracked picture to obtain an updated standard range of color parameter. The updated standard range is used to binarize an initial facial image of the next to-be-tracked picture.

It can be understood that the face tracking process of the last to-be-tracked picture may not include the above step S25.

It should be noted that the present disclosure has been described by way of a mouth as a preset organ. Of course, the predetermined organ can also be other organs. At this time, the region that satisfies the preset organ feature can be specifically set according to the corresponding organ features. For example, the preset organ could be both eyes. At this time, the regions that satisfy the organ feature could be regions of two spaced rectangular boxes, wherein each of the rectangular boxes is a rectangular box of a plurality of consecutive pixel points with a grayscale of 0, and each of the rectangular boxes has a dimension in the width direction of the face one to three times larger than in the length direction of the face.

It should be further noted that the number of to-be-detected pictures and the number of to-be-tracked pictures in each tracking period are not particularly limited, such that the number of to-be-detected pictures in different tracking periods is not necessarily the same, and the number of to-be-detected pictures in different tracking periods is also not necessarily the same. Specifically, in a practical application, a certain picture can be used as a to-be-detected picture to perform the face detection process. When the acquisition of the initial facial image in the to-be-detected picture fails in step S11, the next picture as a to-be-detected picture will be continuously detected; after the initial facial image in the to-be-detected picture is detected, subsequent pictures will be taken as the to-be-tracked picture and the face tracking processing will be performed on each of to-be-tracked pictures to obtain a final facial image in each of the to-be-tracked pictures; and when acquisition of the initial facial image in the current to-be-tracked picture fails in step S21, the next tracking period will start.

The face tracking method according to the embodiment of the present disclosure may be implemented by a circuit designed to perform these corresponding functions, such as a Field Programmable Gate Array (FPGA), an Application Specific integrated Circuit (ASIC), a Digital Signal Processor (DSP), a Neural Network Processing Unit (NPU), for example. It can also be implemented by a processor with general-purpose computing functions, such as a Central Processing Unit (CPU), and a General-Purpose Graphics Processing Unit (GPGPU), for example. That is to say, the face tracking method can implement the functions of each module and each unit by executing an operation instruction through a logic circuit having a logic operation function. The processor can be a logical computing device with data processing capabilities and/or program execution capabilities, such as a Central Processing Unit (CPU) or a Field Programmable Gate Array (FPGA) or a Microprogrammed Control Unit (MCU) or a Digital Signal Processor (DSP) or an application specific integrated circuit (ASIC) or a Graphics Processing Unit (GPU). The one or more processors may be configured to simultaneously execute similar calculation method as described above in a group of processors concurrently calculating or configured to perform the above method in a part of the processor.

As another aspect of the present disclosure, there is provided a face tracking device including a processor and a computer readable storage medium having a computer program stored therein, wherein the steps of the above face tracking method according to the present disclosure can be implemented when the computer program is executed by the processor. The face tracking device further includes an image capture component configured to continuously capture facial images. The face tracking device may be a product having photographing and data processing functions, such as a mobile phone or a video camera.

The explanation of the face tracking method and device according to the present disclosure has been provided as above. It can be seen that, during the face tracking, the present disclosure first performs face detection on the to-be-detected picture, and then performs face tracking on the to-be-tracked picture. Herein, the standard range of the color parameter adapted to the environmental information can be obtained by the face detection, and after obtaining the final facial image in each of the to-be-tracked pictures, the current standard range of the color parameter is updated, so as to match with the environmental information. Since the standard range of the color parameters determines the position of the preset organ and thus determines the position of the final facial image, the face tracking method of the present disclosure can perform face tracking adaptively to the environment. In addition, during the face detection of the to-be-detected picture, the initial facial image in the to-be-detected picture can be obtained by using the haar feature detection, which can improve the accuracy of detection to provide more accurate tracking result in the subsequent process of face tracking; in the process of face tracking, the initial facial image in the to-be-tracked picture can be obtained by the image processing method such as Meanshift without machine learning or deep learning, thereby improving the tracking speed.

It is to be understood that the above embodiments are merely exemplary embodiments provided to explain the principles of the present disclosure. However, the present disclosure is not limited thereto. Various modifications and improvements can be made by those skilled in the art without departing from the spirit and scope of the disclosure, and such modifications and improvements are also considered falling into the scope of the disclosure.

The invention claimed is:

1. A face tracking method, comprising steps of:
   acquiring an initial facial image in a to-be-tracked picture;
   performing binarization processing on the initial facial image according to a standard range of color parameter and an actual value of the color parameter of each pixel in the initial facial image, to obtain a binarized facial image;
   acquiring a position of a preset organ in the binarized facial image; and
   acquiring a position of a final facial image according to the position of the preset organ and a position of the initial facial image, wherein
   the face tracking method includes at least one tracking period in which face tracking is sequentially performed for each one of to-be-tracked pictures, and in which the to-be-tracked pictures are pictures including the same face in a video, and
   in each of the tracking periods, in addition to the last to-be-tracked picture, after the step of acquiring a position of a final facial image, the face tracking method further comprises: updating the standard range of color parameter according to the actual value of the color parameter of each pixel of the initial facial image, the color parameter including hue, saturation, and brightness.

2. The face tracking method according to claim 1, wherein the position of the preset organ is a position of region where a preset organ feature is satisfied.

3. The face tracking method according to claim 2, wherein the step of updating the standard range of color parameter according to the actual value of the color parameter of each pixel of the initial facial image in the to-be-detected picture comprises: using the initial facial image in the to-be-tracked picture as a to-be-processed image, and performing the image processing on the initial facial image in the to-be-detected picture by a preset standard range calculation method, to obtain a standard range of hue, a standard range saturation, and a standard range brightness.

4. The face tracking method according to claim 3, wherein the preset standard range calculation method comprises:
   presetting a plurality of groups of reference ranges, each group of reference ranges including a reference range of hue, a reference range of saturation, and a reference range of brightness, wherein reference ranges of brightness in different groups are different from each other;
   performing binarization processing on the to-be-processed image according to each group of reference ranges, wherein when performing binarization processing on the to-be-processed image, if the actual values of the hue, saturation and brightness of a pixel are within the corresponding reference ranges, greyscale of the pixel is set to 255, otherwise, the greyscale of the pixel is set to 0;
   judging whether there is a region in each of the binarized images that satisfies the preset organ feature, and if yes, recording a current group of reference ranges; and
   for the groups of reference ranges recorded, averaging the reference ranges of the hue, the reference ranges of the saturation, and the reference ranges of the brightness, respectively, to obtain a standard range of hue, a standard range of saturation, and a standard range of brightness corresponding to the to-be-processed image.

5. The face tracking method according to claim 4, wherein in each group of reference ranges, the reference range of the hue is 0-180, the reference range of the saturation is 20-255, and the reference range of the brightness is V-255, wherein V is an integer greater than or equal to zero and less than 255 and in different groups of the reference range, values of V are different from each other.

6. The face tracking method according to claim 5, wherein from the first group to the last group of reference ranges, the values of V are increased by a predetermined step length.

7. The face tracking method according to claim 6, wherein the predetermined step length is 10.

8. The face tracking method according to claim 3, wherein the preset organ includes a mouth, and the region that satisfies the preset organ feature is a rectangular region formed of successive pixel points having the greyscale of 0, and the rectangular region has a dimension in a width direction of the face three times larger than in a length direction of the face.

9. The face tracking method according to claim 3, wherein in each of the tracking period, the method further comprises performing a face detection process before the first to-be-tracked picture is received, the face detection process including:
   acquiring the initial facial image in the to-be-detected picture, wherein the to-be-detected picture is a picture that is located before the to-be-tracked picture and includes the same face as the to-be-tracked picture; and
   using the initial facial image in the to-be-detected picture as the to-be-processed image, and performing image processing on the initial facial image in the to-be-detected picture by the preset standard range calculation method, to obtain an initial standard range of color parameter, wherein the initial standard range of color parameter is used to binarize the initial facial image in the first to-be-tracked picture.

10. The face tracking method according to claim 9, wherein the to-be-detected picture is an RGB image and the step of acquiring the initial facial image in the to-be-detected picture comprises:

acquiring an image of an initial face region in the to-be-detected picture;

pre-processing the image acquired to eliminate noises in the image; and converting a pre-processed image from an RGB image to an HSV image.

11. The face tracking method according to claim 9, wherein the image of the initial face region in the to-be-detected picture is acquired by haar feature detection.

12. The face tracking method according to claim 1, wherein the to-be-tracked picture is an RGB image, and the step of acquiring an initial facial image in a to-be-tracked picture comprises:

acquiring an image of an initial face region in the to-be-tracked picture;

pre-processing the image acquired to eliminate noises in the image; and converting a pre-processed image from an RGB image to an HSV image.

13. The face tracking method according to claim 12, wherein the image of the initial face area in the to-be-tracked picture is acquired by the camshift algorithm.

14. A face tracking device, comprising a processor and a non-transitory computer readable storage medium in which a computer program is stored, wherein the steps of the face tracking method according to claim 1 are implemented when the computer program is executed by the processor.

15. The face tracking device according to claim 14, further comprising an image capture component configured to continuously capture facial images.

* * * * *